United States Patent Office 3,573,317
Patented Mar. 30, 1971

3,573,317
3-TRICHLOROMETHYL-5-SUBSTITUTED-1,2,4-THIADIAZOLES
Eric Smith, Madison, Conn., assignor to Olin Corporation
No Drawing. Filed Aug. 12, 1968, Ser. No. 751,728
Int. Cl. C07d *31/50*
U.S. Cl. 260—294.8     3 Claims

ABSTRACT OF THE DISCLOSURE

3 - trichloromethyl - 5 - substituted - 1,2,4 - thiadiazoles having the formula

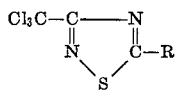

wherein R is 2'-pyridylthio-1'-oxide, aryloxy, haloaryloxy, nitroaryloxy, nitrohaloaryloxy, arylamino, haloarylamino, arylthio, carboxyarylthio, N,N-dialkyldithiocarbamoyl, arylthiazolyl or alkenylamino are prepared by reacting 3 - trichloromethyl - 5 - chloro - 1,2,4 - thiadiazole with the appropriate active hydrogen-containing compound, or a metal salt thereof. These compounds are valuable aquatic herbicides and biocides.

---

This invention relates to selectively substituted thiadiazoles having biocidal and aquatic herbicidal properties. More particularly, this invention relates to 3-trichloromethyl-5-substituted-1,2,4-thiadiazoles having the formula

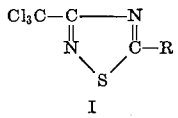

I wherein R is 2'-pyridylthio-1'-oxide, aryloxy, haloaryloxy, nitroaryloxy, nitrohaloaryloxy, arylamino, haloarylamino, arylthio, carboxyarylthio, N,N - dialkyldithiocarbamoyl, arylthiazolyl or alkenylamino.

Various 3 - trichloromethyl - 5 - substituted - 1,2,4-thiadiazoles have been previously prepared and reported in the literature. For example U.S. Patent 3,260,725 discloses certain substituted thiadiazoles which are useful as soil fungicides.

Now it has been found in accordance with this invention that selectively substituted thiadiazoles having the Formula I can be prepared which are efficacious aquatic herbicides and biocides.

The compounds I of this invention are prepared by reacting 3 - trichloromethyl - 5 - chloro - 1,2,4 - thiadiazole with selected active-hydrogen containing compounds, or metal salts thereof, in accordance with the following general equation wherein R is as previously described and M is an inorganic cation such as an alkali or alkaline earth metal.

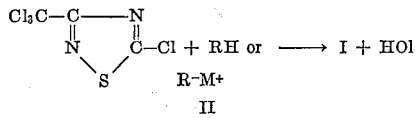

II

Illustrative compounds which can be employed in the preparation of the substituted thiadiazoles of this invention are those having the Formula II wherein R is 2'-pyridylthio-1'-oxide, pyridyloxy, phenoxy, halophenoxy, nitrophenoxy, nitrohalophenoxy, anilino haloanilino, pyridylamino, benzylthio, carboxyphenylthio, N,N - di (lower)alkyldithiocarbamoyl, benzothiazolyl or (lower) alkenylamino.

Representative compounds II include sodium 2-mercaptopyridine - 1 - oxide; sodium phenoxide; halophenoxides such as potassium o-chlorophenoxide, sodium p-bromophenoxide, potassium 2-chloro-4-fluorophenoxide, potassium pentachlorophenoxide, and the like; nitrophenoxides such as sodium p-nitrophenoxide and sodium 2,4-dinitrophenoxide; halonitrophenoxides such as 2-nitro-4-chlorophenoxide, 2 - nitro - 3,4 - dichlorophenoxide, 2-nitro - 4 - bromophenoxide, 3 - nitro - 5 - chlorophenoxide, and the like; haloanilines such as m-chloroaniline, p-bromoaniline, m-fluoroaniline, 2,4 - dichloroaniline and 2,4,6-trichloroaniline; amino pyridines such as 2-aminopyridine and 3-aminopyridine; sodium pyridine oxides such as sodium 4-pyridinolate, sodium 2-pyridinolate, potassium 3-pyridinolate and the like; sodium benzylmercaptide; sodium mercaptobenzoates such as sodium o-mercaptobenzoate and sodium p-mercaptobenzoate; sodium dialkyldithiocarbamates such as sodium diethyldithiocarbamate and sodium dibutyldithiocarbamate; and mercaptobenzothiazoles such as 2-mercaptobenzothiazole and 4-mercaptobenzothiazole; and lower alkenyl amines such as allylamine and n-2-butenylamine, and the like.

Particularly preferred in the preparation of the thiadiazoles of this invention are compounds II wherein R is 2'-pyridylthio-1'-oxide, pyridyloxy, phenoxy, benzylthio, carboxyphenylthio and nitrochlorophenoxy.

The 3- trichloromethyl - 5 - substituted - 1,2,4 - thiadiazoles I of this invention are readily prepared by reacting 3 - trichloromethyl - 5 - chloro - 1,2,4 - thiadiazole with the appropriate co-reaction II at a temperature between about 0° and about 150° C., and preferably at a temperature between about 30° and about 120° C.

While the reaction will proceed in the absence of a solvent, it is preferred to employ solvent or inert diluents in the preparation of the thiadiazoles I. Suitable solvents include acetone, water, methylethyl ketone, xylene, ethyl ether, chloroform, carbon tetrachloride and chlorobenzene.

Where a basic compound having the formula RH is employed as co-reactant II, an excess of the compound may be employed to pick up the hydrogen chloride evolved in the reaction. If a compound having the formula RH that is not strongly basic is employed, acid acceptors such as triethylamine, tributylamine, pyridine, dimethylaniline and the like can be used.

The 3 - trichloromethyl - 5 - substituted - 1,2,4 - thiadiazoles I are obtained in high yield and excellent purity, and are readily isolated by conventional techniques such as fiiltration, distillation, recrystallization, and the like.

As previously mentioned, the 3 - trichloromethyl - 5-substituted - 1,2,4 - thiadiazoles I of this invention are valuable aquatic herbicides. The efficacy of the compounds of this invention for this application was particularly surprising and unexpected since it was found that 3 - trichloromethyl - 5 - ethoxy - 1,2,4 - thiadiazole was ineffective in certain application where the compounds of this invention exhibited strong aquatic herbicidal properties. For example, 3 - trichloromethyl - 5 - (2' - pyridylthio - 1' - oxide) - 1,2,4 - thiadiazole at a concentration of 10 p.p.m. was 90, 90 and 77% effective after 2 weeks in inhibiting the growth of the aquatic weeds Naiad, Elodea and Coontail, respectively, while 10 p.p.m. of 3 - trichloromethyl - 5 - ethoxy - 1,2,4 - thiadiazole was totally ineffective in inhibiting the growth of the aforementioned weeds after the same interval.

The 3 - trichloromethyl - 5 - substituted - 1,2,4 - thiadiazole I of this invention are also valuable biocides, having broad anti-bacterial spectra. For example, the following in vitro spectrum of 5 - (2' - pyridinethio - 1' - oxide)-3 - trichloromethyl - 1,2,4 - thiadiazole is illustrative.

TABLE

| Organism: | Minimal inhibitory concentration, (microgram/ml.) |
| --- | --- |
| *Streptococcus faecalis* | 4.5 |
| *Pseudomonas aeruginosa* | 18 |
| *Salmonella schottmülleri* | 6.25 |
| *Staphylococcus aureus* | 3.1 |
| *Aerobacter aerogenes* | 0.3 |
| *Proteus vulgaris* | 12.5 |
| *Bacillus subtilis* | 6.25 |
| *Klebsiella pneumoniae* | 2.5 |
| *Escherichia coli* | 4.5 |
| *Lactobacillus casei* | 12.5 |

Thus, the thiadiazoles I of this invention can be employed as biocides for paints, plastics, cements, and the like.

The following examples will serve to illustrate the preparation of various 3-trichloromethyl-5-substituted-1,2,4-thiadiazoles in accordance with the practice of this invention.

EXAMPLE 1

A solution of 3-trichloromethyl-5-chloro-1,2,4-thiadiazole (23.80 g.) in 70 ml. acetone was added to a mixture of sodium 2-mercaptopyridine-1-oxide (16.50 g.) in water (50 ml.) in a 3-necked flask fitted with mechanical stirrer, condenser and immersed thermometer. The reaction mixture was held for approximately 30 minutes at 23–30° C. and then poured into 500 ml. of water, thereby obtaining 29.5 g. of a precipitate. Recrystallization from cyclohexane provided a product having a melting point of 123–127° C. The following analytical data revealed that 3-trichloromethyl-5-(2'-pyridylthio-1'-oxide) - 1,2,4 - thiadiazole had been obtained.

*Analysis.*— Calcd. for $C_8H_4Cl_3N_3OS_2$ (percent): C, 29.24; H, 1.23; N, 12.78. Found (percent) C, 29.91; H, 1.39; N, 13.17.

EXAMPLE 2

Following the procedure of Example 1, 3-trichloromethyl-5-chloro-1,2,4-thiadiazole (23.80 g.) was reacted with sodium phenoxide (11.4 g.) in a mixture of 40 ml. water and 60 ml. acetone. After heating for one hour at 50° C., the reaction mixture was poured into 500 ml. of water and extracted with ether. Distillation of the extract provided 23.3 g. of oily product, B.P. 156–157° C./1.5 mm. Hg. The following analytical data revealed that 3-trichloromethyl-5-phenoxy-1,2,4-thiadiazole had been obtained.

*Analysis.*—Calcd. for $C_9H_5Cl_3N_2OS$ (percent): C, 36.57; H, 1.71; Cl, 36.0; N, 9.48. Found (percent): C, 36.50; H, 1.93; Cl, 36.3; N, 9.31, 9.00.

EXAMPLE 3

Potassium pentachlorophenoxide was prepared by reacting potassium hydroxide (6.6 g.) with pentachlorophenol (26.64 g.) in water (400 ml.), followed by evaporation of the solvent. The potassium pentachlorophenoxide was refluxed with 3-trichloromethyl-5-chloro-1,2,4-thiadiazole (23.80 g.) in 100 ml. of xylene for 18 hours and potassium chloride was removed by filtration. Evaporation of the filtrate provided 6.6 g. of residue, which was recrystallized from hexane to yield a solid product having a melting point of 174–176° C. The following analytical data revealed that 3-trichloromethyl-5-pentachlorophenoxy-1,2,4-thiadiazole had been obtained.

*Analysis.*—Calcd. for $C_9Cl_8N_2SO$ (percent): C, 23.11; H, 0.0; Cl, 60.66; N, 5.99. Found (percent) C, 23.32; H, 0.1; Cl, 60.9; N, 6.35.

EXAMPLE 4

The amount of 24.0 g. of 3-trichloromethyl-5-chloro-1,2,4-thiadiazole was added to a solution of sodium p-nitrophenoxide (16.1 g.) in a mixture of 350 ml. water and 500 ml. acetone. After allowing the reaction mixture to stand overnight at room temperature, evaporation of the solvent and washing of the residue with water provided 17.4 g. of a crystalline product. Recrystallization from ethanol yielded colorless crystals having a melting point of 109–111° C. The following analytical data revealed that 3-trichloromethyl-5 - (p-nitrophenoxy) - 1,2,4-thiadiazole had been obtained.

*Analysis.*—Calcd. for $C_9H_4Cl_3N_3O_3S$: (percent) C, 31.97; H, 1.19; N, 12.34; S, 9.60. Found (percent) C, 32.24; H, 1.23; N, 12.31; S. 9.50.

EXAMPLE 5

Following the general procedure of the previous examples, 3- trichloromethyl-5-chloro-1,2,4-thiadiazole (23.80 g.) was refluxed for 2 hours with potassium 2-nitro-4-chlorophenoxide (21.24 g.) in a mixture of 100 ml. water and 300 ml. acetone. Then the reaction mixture was evaporated to 200 ml., poured into 500 ml. of water and filtered to provide 28.4 g. of solid product. Recrystallization from cyclohexane provided a solid product having a melting point of 113–118° C. The following analytical data revealed that 3-trichloromethyl-5-(o-nitro-p-chlorophenoxy)-1,2,4-thiadiazole had been obtained.

*Analysis.*—Calcd. for $C_9H_3Cl_4N_3O_3S$ (percent): C, 28.83; H, 0.81; Cl. 37.81; N, 11.21. Found (percent): C, 29.12; H, 1.08; Cl, 37.80; N, 11.48.

EXAMPLE 6

3-trichloromethyl-5-chloro-1,2,4-thiadiazole (23.80 g.) and m-chloroaniline (25.52 g.) were refluxed in 50 ml. of xylene for 2¼ hours. After cooling to room temperature, the reaction mixture was filtered and the filtrate evaporated to remove xylene. The resulting solid product was slurried with dilute hydrochloric acid, filtered, dried and recrystallized from cyclohexane to provide a product having a melting point of 149.5–152° C. The following analytical data revealed that 3-trichloromethyl-5-(m-chloroanilino)-1,2,4-thiadiazole had been obtained.

*Analysis.*—Calcd. for $C_9H_5Cl_4N_3S$ (percent): C, 32.82; H, 1.53; Cl, 43.06; N, 12.76. Found (percent): C, 33.12; H, 1.69; Cl, 42.8; N, 12.67.

EXAMPLE 7

3-trichloromethyl-5-chloro-1,2,4-thiadiazole (23.80 g.) and 2-aminopyridine (18.6 g.) were refluxed in 100 ml. of xylene for 30 minutes. The solvent was removed by distillation and 150 ml. of water was added to the residue. Filtration provided 12.0 g. of solid product, which was recrystallized from cyclohexane to provide crystals having a melting point of 168–171° C. The following analytical data revealed that 3-trichloromethyl-5-(2'-pyridylamino)-1,2,4-thiadiazole had been obtained.

*Analysis.*—Calcd. for $C_8H_4Cl_3N_4S$ (percent): Cl, 36.12; N, 19.02. Found (percent): Cl, 36.0; N, 18.94; 36.2.

EXAMPLE 8

A solution of 3 - trichloromethyl-5-chloro-1,2-thiadiazole (24.0 g.) in 50 ml. acetone was added to a mixture of 4-hydroxypridine (9.5 g.) and sodium hydroxide (4.0 g.) in 50 ml. water. After about 5 minutes, an exothermic reaction had occurred and crystals had separated from the reaction mixture. The reaction mixture was allowed to stand for 10 minutes; 200 ml. of water were added and the mixture filtered to provide 25.8 g. of precipitate. Recrystallization from toluene provided golden crystals having a melting point of 207–210° C. The following analytical data revealed that 3 - trichloromethyl-5-(4'-pyridyloxy)-1,2,4-thiadiazole had been obtained.

*Analysis.*—Calcd. for $C_8H_4N_3OSCl_3$ (percent): C, 32.40; H, 1.36; N, 14.17; S, 10.81. Found (percent): C, 32.46; H, 1.45; N, 14.57; S, 10.72, 10.75.

EXAMPLE 9

3 - trichloromethyl-5-chloro-1,2,4-thiadiazole (24.0 g.) was added to a mixture of benzylmercaptan (12.4 g.)

and sodium hydroxide (4.0 g.) in 200 ml. water. An exothermic reaction occurred immediately; tributylamine (18.5 g.) was then added. The temperature of the reaction mixture rose to about 70° C. and the mixture turned brown. Water (200 ml.) was then added to the reaction mixture; the resulting brown oil was dissolved in hexane, filtered and the filtrate cooled in solid carbon dioxide. A sticky solid separated from the mixture. The hexane was decanted and the solid allowed to melt to provide 16 g. of a brown oil. Distillation of the oily product provided 6.34 g. of a yellow oil boiling at 177–182° C./0.6–0.7 mm. Hg. The following analytical data revealed that 3 - trichloromethyl-5-benzylthio1,2,4-thiadiazole had been obtained.

*Analysis.*—Calcd. for $C_{16}H_7Cl_3N_2S_2$ (percent): N, 8.60; S, 19.68. Found (percent): N, 8.31; S, 20.32, 20.11.

EXAMPLE 10

A solution of 3-trichloromethyl-5-chloro-1,24,-thiadiazole (12.0 g.) in 100 ml. acetone was added to a mixture of o-mercaptobenzoic acid (7.7 g.) and sodium hydroxide (2.0 g.) in 30 ml. water. After refluxing for 15 minutes, the reaction mixture was poured into an excess saturated sodium bicarbonate solution to provide a milky suspension. After filtration to remove insoluble matter, the filtrate was acidified. The amount of 14 g. of crystals separated from the filtrate. Recrystallization from aqueous methanol provided crystals having a melting point of 148–152° C. The following analytical data revealed that 3 - trichloromethyl-5-(2'-carboxyphenylthio)-1,2,4-thiadiazole had been obtained.

*Analysis.*—Calcd. for $C_9H_5N_2S_2O_2Cl_3$ (percent): C, 33.78; H, 1.42; N, 7.88; Cl, 29.95. Found (percent): C, 35.36; H, 1.64; N, 7.96; Cl, 28.80.

EXAMPLE 11

3 - trichloromethyl-5-chloro-1,2,4-thiadiazole (23.80 g.) in 110 ml. of acetone was added to a solution of sodium diethyl dithiocarbonate trihydrate (22.5 g.) in 60 ml. water. After heating at 30° C. for 2½ hours, the reaction mixture was poured into excess water, thereby providing 24.0 g. of a solid product. Recrystallization from hexane provided crystals having a melting point of 101–104° C. The following analytical data revealed that 3 - trichloromethyl-5-(N,N-diethyldithiocarbamoyl)-1,2,4-thiadiazole had been obtained.

*Analysis.*—Calcd. for $C_8H_{10}Cl_3N_3S_3$ (percent): C, 27.39; H, 2.87; Cl, 30.33; N, 11.98; S, 27.42. Found (percent): C, 27.56; H, 2.95; Cl, 30.7; N, 12.32; S, 27.67.

EXAMPLE 12

A solution of 3-trichloromethyl-5-chloro-1,2,4-thiadiazole (23.80 g.) in 12 ml. acetone was added to a mixture of 2-mercaptobenzthiazole (16.7 g.) and sodium hydroxide (4.0 g.) in 70 ml. water. The reaction mixture was heated for 30 minutes at 30–40° C. and then poured into water; a solid material separated from the reaction mixture. Filtration provided 29.5 g. of crystals which were recrystallized from cyclohexane to provide a product having a melting point of 143.5–146.5° C. The following analytical data revealed that 3 - trichloromethyl-5-(2'-benzothiazolyl)-1,2,4-thiadiazole had been obtained.

*Analysis.*—Calcd. for $C_{10}H_4Cl_3N_3S_3$ (percent): C, 32.58; H, 1.09; Cl, 28.86; N, 11.40. Found (percent): C, 33.26; H, 1.30; Cl, 28.4; N, 11.45.

EXAMPLE 13

The amount of 23.80 g. of 3-trichloromethyl-5-chloro-1,2,4-thiadiozole was added to a solution of allylamine (11.4 g.) in ether. The reaction mixture was held at 20–30° C. for 30 minutes. After evaporation of the ether, the residue was poured into water; a solid material separated from the mixture. Filtration provided 25.0 g. of product, which was recrystallized from hexane to provide crystals having a melting point of 104–107° C. The following analytical data revealed that 3-trichloromethyl-5-allylamino-1,2,4-thiadiazole had been obtained.

*Analysis.*—Calcd. for $C_6H_6Cl_3N_3S$: (percent): Cl, 41.15; N, 16.25. Found (percent): Cl, 41.2; N, 16.35.

What is claimed is:

1. A 3 - trichloromethyl-5-substituted-1,2,4-thiadiazole having the formula

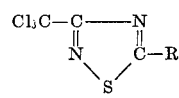

wherein R is selected from the group consisting of 2'-pyridylthio-1'-oxide, pyridyloxy, and pyridylamino.

2. The compound of claim 1 having the name 3-trichloromethyl - 5 - (2' - pyridylthio - 1' - oxide)-1,2,4-thiadiazole.

3. The compound of claim 1 having the name 3-trichloromethyl-5-(4'-pyridyloxy)-1,2,4-thiadiazole.

References Cited

UNITED STATES PATENTS 2,744,908    5/1956    Young _____ 260—302

ALAN L. ROTMAN, Primary Examiner

U.S. Cl. X.R.

260—302, 306.8, 999; 71—92, 94